United States Patent
Wang et al.

(10) Patent No.: US 12,025,701 B2
(45) Date of Patent: Jul. 2, 2024

(54) DYNAMIC SIGNAL CONTROL IN FLASH LiDAR

(71) Applicant: GUANGZHOU WOYA LAIDELING TECHNOLOGY CO., LTD., Guangzhou (CN)

(72) Inventors: Chao Wang, Mountain View, CA (US); Lingkai Kong, Mountain View, CA (US)

(73) Assignee: GUANGZHOU WOYA LAIDELING TECHNOLOGY CO., LTD., Guangzhou (CN)

( * ) Notice: Subject to any disclaimer, the term of this patent is extended or adjusted under 35 U.S.C. 154(b) by 934 days.

(21) Appl. No.: 17/068,802

(22) Filed: Oct. 12, 2020

(65) Prior Publication Data
US 2022/0113407 A1 Apr. 14, 2022

(51) Int. Cl.
| | | |
|---|---|---|
| G01S 17/08 | (2006.01) | |
| G01S 7/481 | (2006.01) | |
| G01S 17/894 | (2020.01) | |
| G01S 17/931 | (2020.01) | |

(52) U.S. Cl.
CPC ............ *G01S 17/08* (2013.01); *G01S 7/4811* (2013.01); *G01S 17/894* (2020.01); *G01S 17/931* (2020.01)

(58) Field of Classification Search
CPC ...... G01S 7/4811; G01S 7/489; G01S 7/4868; G01S 17/894
See application file for complete search history.

(56) References Cited

U.S. PATENT DOCUMENTS

| | | | |
|---|---|---|---|
| 11,181,807 B1 * | 11/2021 | Ray ................. | H04N 23/73 |
| 2007/0058038 A1 * | 3/2007 | David .............. | G01S 7/483 |
| | | | 348/135 |
| 2009/0322616 A1 * | 12/2009 | Bandhauer ........ | G01S 13/18 |
| | | | 342/419 |
| 2013/0201288 A1 * | 8/2013 | Billerbeck ........ | H04N 13/204 |
| | | | 348/46 |
| 2015/0049168 A1 * | 2/2015 | Dielacher ........ | H04N 7/18 |
| | | | 348/169 |
| 2020/0150271 A1 * | 5/2020 | Iwai ................. | G01S 7/4865 |
| 2020/0249318 A1 * | 8/2020 | Henderson ........ | G01S 7/4865 |
| 2021/0109215 A1 * | 4/2021 | Schmitz ........... | G01S 7/484 |
| 2023/0179841 A1 * | 6/2023 | Itaba ............... | G01S 7/4868 |
| | | | 348/148 |

* cited by examiner

*Primary Examiner* — Eric L Bolda
(74) *Attorney, Agent, or Firm* — BAYES PLLC (57) ABSTRACT

Embodiments of the disclosure provide an optical sensing system, a method for controlling the optical sensing system, and a controller for the optical sensing system. The exemplary method for controlling the optical system includes dividing a detection range of the optical sensing system into a plurality of sections, where each section covers a different range of distances to the optical sensing system. For each divided section, the transmitter of the optical sensing system transmits an optical signal to each section of the plurality of sections. The receiver of the optical sensing system then receives the optical signal returned from the corresponding section of the plurality of sections. After receiving the retuned optical signal from each divided section, these optical signals are then combined to form a detection signal of the detection range of the optical sensing system.

20 Claims, 6 Drawing Sheets

DYNAMIC SIGNAL CONTROL IN FLASH LiDAR

TECHNICAL FIELD

The present disclosure relates to dynamic signal control in flash LiDAR (light detection and ranging) system, and more particularly to, control of emitting power and/or detecting gain for a plurality of sections within a detection range of a flash LiDAR system.

BACKGROUND

LiDAR is a kind of technology for measuring distances by illuminating a target with laser light and measuring the reflection with a sensor or detector. Differences in laser return time and wavelengths can then be used to make a digital 3-D (three dimensional) representation of the target. LiDAR can be divided into different categories, including scanning LiDAR and flash LiDAR. Comparing to the scanning LiDAR, which utilizes a well-collimated laser beam to cover one point each time and continuously scans the whole interested region, the flash LiDAR illuminates the full interested region with just one extensively diverged laser pulse. Next, a ToF (time of flight) camera or single-photon avalanche diode (SPAD) array sensor is used to capture returning laser signal reflected from the interested region, and then 3-D representation and reflectivity information of the interested region is generated accordingly.

In order to extend the detection range as far as possible for a flash LiDAR system, it is desirable to use a higher emitting power for the output laser and a higher gain for the detector of the system. In this way, the signal reflected from an object at a far distance would be sufficient for detection. However, this implementation may result in the signal reflected from objects at a closer distance to be too strong in practical applications, which would cause certain problems in generating the 3-D representation and reflectivity information of the interested region, as described below.

First, the detector or sensor can be saturated by the returning signals from the objects at a closer distance, and thus lose the ability to provide accurate intensity information of the returning signals of such objects.

Second, the generated images for the objects may be also distorted. Generally, after the reflected light passing through the receiving optics, each point on an object will form a pattern (also called "airy disk") on the detector. The center spot of an airy disk contains most of the energy. In many circumstances, as long as the size of a center spot is equal to or less than the pixel size of the detector, a clear image will be formed. However, for points from an object at a closer distance, if the emitting power of the output laser and/or the gain of the detector are set too high, the side lobes will extend the spot much wider, which means that it will influence adjacent pixels when the signal intensity of side lobes is strong enough to trigger the detection. This then will distort the image of the close object by making it way larger than it should be. In the worst scenario, the enlarged image will wash out the full picture and prevent any object from being detected.

Embodiments of the disclosure improve signal control in a LiDAR system by dividing the detection range of the LiDAR system into a plurality of sections with different distances, and independently controlling the emitting power and/or detecting gain for each of the plurality of sections within the detection range during signal detection.

SUMMARY

Embodiments of the disclosure provide a method for dynamic signal control of an optical sensing system. The exemplary method includes dividing a detection range of the optical sensing system into a plurality of sections, where each section covers a different range of distances to the optical sensing system. The exemplary method further includes transmitting, by a transmitter of the optical sensing system, an optical signal to each section of the plurality of sections. The exemplary method additionally includes detecting, by a receiver of the optical sensing system, the optical signal returned from the corresponding section of the plurality of sections. The exemplary method additionally includes combining the optical signals returned from the plurality of sections to form a detection signal of the detection range.

Embodiments of the disclosure also provide an exemplary optical sensing system. The exemplary optical sensing system includes a transmitter configured to transmit an optical signal to each section of a plurality of sections, where the plurality of sections are divided from a detection range of the optical sensing system, and each section covers a different range of distances to the optical sensing system. The exemplary optical sensing system further includes a receiver configured to detect the optical signal returned from each section of the plurality of sections. The exemplary optical sensing system additionally includes a controller that is configured to divide the detection range of the optical sensing system into the plurality of sections, and combine the optical signals returned from the plurality of sections to form a detection signal of the detection range of the optical sensing system.

Embodiments of the disclosure also provide an exemplary controller for an optical sensing system. The exemplary controller includes a processor and a non-volatile memory containing computer program instructions that are configured to be executed by the processor to perform certain operations. The certain operations to be performed by the processor include dividing a detection range of the optical sensing system into a plurality of sections, where each section covers a different range of distances to the optical sensing system. The certain operations to be performed by the processor also include controlling a transmitter of the optical sensing system to emit an optical signal to each section of the plurality of sections. The certain operations to be performed by the processor further include controlling a receiver of the optical sensing system to detect the optical signal returned from each section of the plurality of sections. The certain operations to be performed by the processor additionally include combining the optical signals returned from the plurality of sections to form a detection signal of the detection range of the optical sensing system.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Embodiments of the present disclosure provide systems and methods for dynamic signal control of an optical sensing system (e.g., a flash LiDAR system) for detecting a plurality of sections within a detection range of the optical sensing system. The disclosed optical sensing system may include a transmitter configured to sequentially emit an optical signal (e.g., a wide diverging laser beam) towards each of the plurality of sections within the detection range. In some embodiments, the emitting power configured for each optical signal may be different for each section according to the overall distance of each section to the optical sensing system. For example, the emitting power for a section further away from the optical sensing system may be set to be higher than a section closer to the optical sensing system.

Further, the disclosed optical sensing system may also include a receiver to receive the optical signal returned from each of the plurality of sections. In some embodiments, the receiver may include a photon detector to detect the optical signal returned from each of the plurality of sections. To better sensing sections at different distances, the detecting gain for each section may also be set differently. For example, the detecting gain for a section further away from the optical sensing system may be set to be higher than a section closer to the optical sensing system.

In some embodiments, the optical sensing system may also include a controller configured to dynamically control signal in a detection process by dynamically controlling the emitting power and/or detecting gain for each section of a plurality of sections within the detection range of the optical sensing system. For instance, the controller may dynamically control the emitting power and/or detecting gain for each section to allow the product of the emitting power and the detecting gain of each section to be proportional to a square of a maximum distance in the range of distances covered by each section. Considering that optical signal normally decreases with the square of the distance, by controlling the product of the emitting power and the detecting gain of each section to be proportional to a square of a maximum distance in the range of distances covered by each section, the airy disks formed on the detector for points from objects in different sections may be similar to each other, no matter what the distance of these objects is to the optical sensing system. Implemented this way, when the detection range of the optical sensing system is extended to a far distance, the detector or sensor may be not necessarily saturated by the returning signal from the objects at a closer distance, and the images generated for such objects may not necessarily be distorted, since each section has its determined emitting power and detecting gain. Meanwhile, due to the enhanced emitting power and detecting gain set for the sections at a far distance, even furthest objects may be sensed clearly and accurately. Therefore, the detection range of the optical sensing system can be effectively increased, without a sacrifice of the detection accuracy and image quality of the objects at a closer distance.

The improved optical sensing system can be used in many applications. For example, the improved optical sensing system can be used in advanced navigation technologies, such as to aid autonomous driving or to generate high-definition maps, in which the optical sensing system can be equipped on a vehicle.

Figure 1:
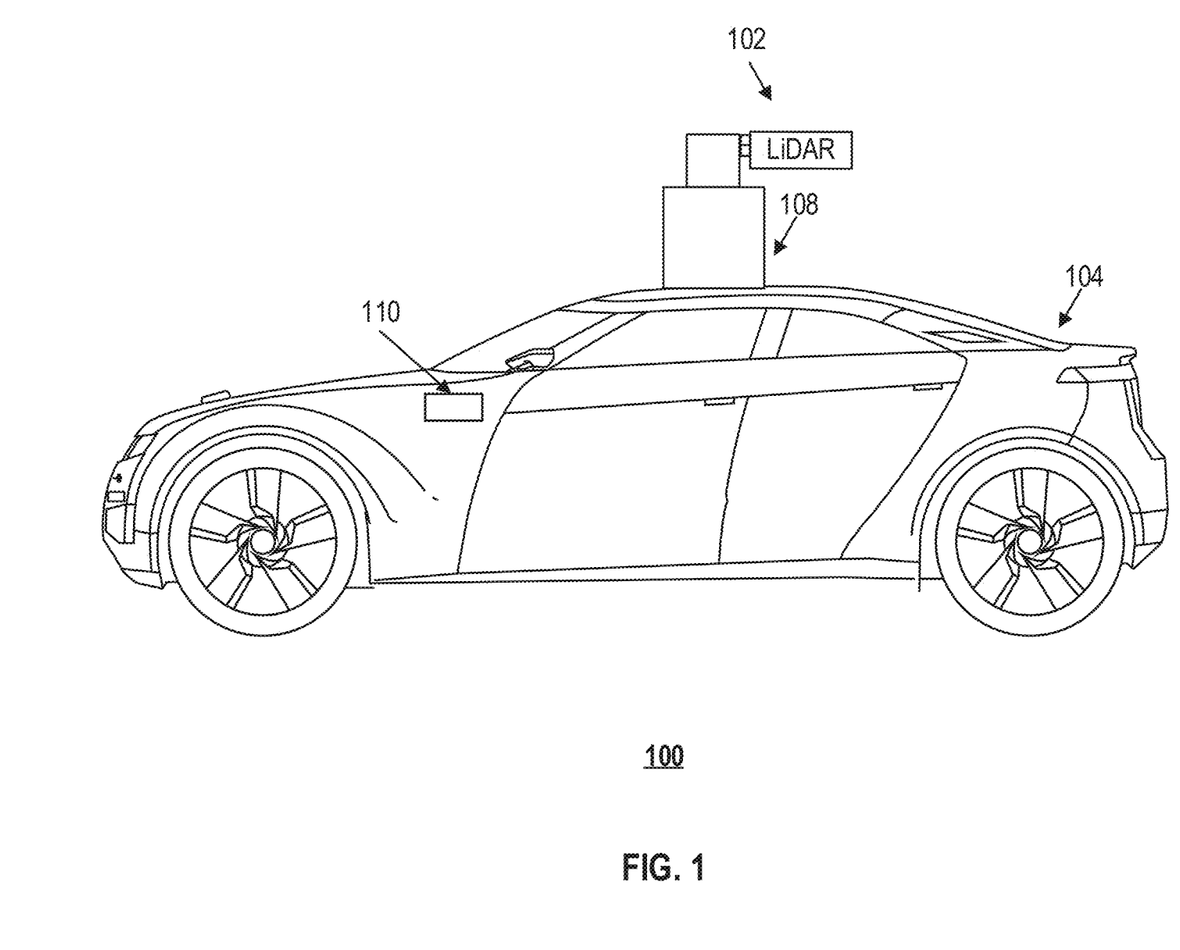
FIG. 1 illustrates a schematic diagram of an exemplary vehicle equipped with a flash LiDAR system, according to embodiments of the disclosure.

FIG. 1 illustrates a schematic diagram of an exemplary vehicle 100 equipped with an optical sensing system (e.g., a flash LiDAR system) 102 (hereinafter also referred to as LiDAR system 102), according to embodiments of the disclosure. Consistent with some embodiments, vehicle 100 may be a survey vehicle configured for acquiring data for constructing a high-definition map or 3-D buildings and city modeling. Vehicle 100 may also be an autonomous driving vehicle.

As illustrated in FIG. 1, vehicle 100 may be equipped with LiDAR system 102 mounted to a body 104 via a mounting structure 108. Mounting structure 108 may be an electro-mechanical device installed or otherwise attached to body 104 of vehicle 100. In some embodiments of the present disclosure, mounting structure 108 may use screw(s), adhesive, or another mounting mechanism. Vehicle 100 may be additionally equipped with a sensor 110 inside or outside body 104 using any suitable mounting mechanisms. Sensor 110 may include sensors used in a navigation unit, such as a Global Positioning System (GPS) receiver and one or more Inertial Measurement Unit (IMU) sensors. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3-D sensing performance.

Consistent with some embodiments, LiDAR system 102 and sensor 110 may be configured to capture data as vehicle 100 moves along a trajectory. For example, a transmitter of LiDAR system 102 may be configured to illuminate the entire detection range surrounding LiDAR system 102. In some embodiments, LiDAR system 102 may include a ToF camera or a SPAD array sensor. The ToF camera or SPAD array sensor in LiDAR system 102 contains an array of sensors, each pixel of which collects 3-D location and intensity information for the objects in the detection range. Consistent with the present disclosure, instead of a single pulse that is emitted to the environment to detect the entire detection range in the detection range, multiple laser beams may be sequentially emitted for a plurality of sections in the detection range, where each laser beam is emitted to detect one section of the plurality of sections in the detection range. The laser beams used for LiDAR system 102 may be ultraviolet, visible, or near-infrared, and may be dynamically adjusted for the emitting power to be used for different sections. In some embodiments of the present disclosure, LiDAR system 102 may capture point clouds including depth information of the objects in each section of the detection range, which are then combined to provide an overall 3-D location and intensity information of the whole detection range. As vehicle 100 moves along the trajectory, LiDAR system 102 may continuously capture data for different detection ranges.

Figure 2:
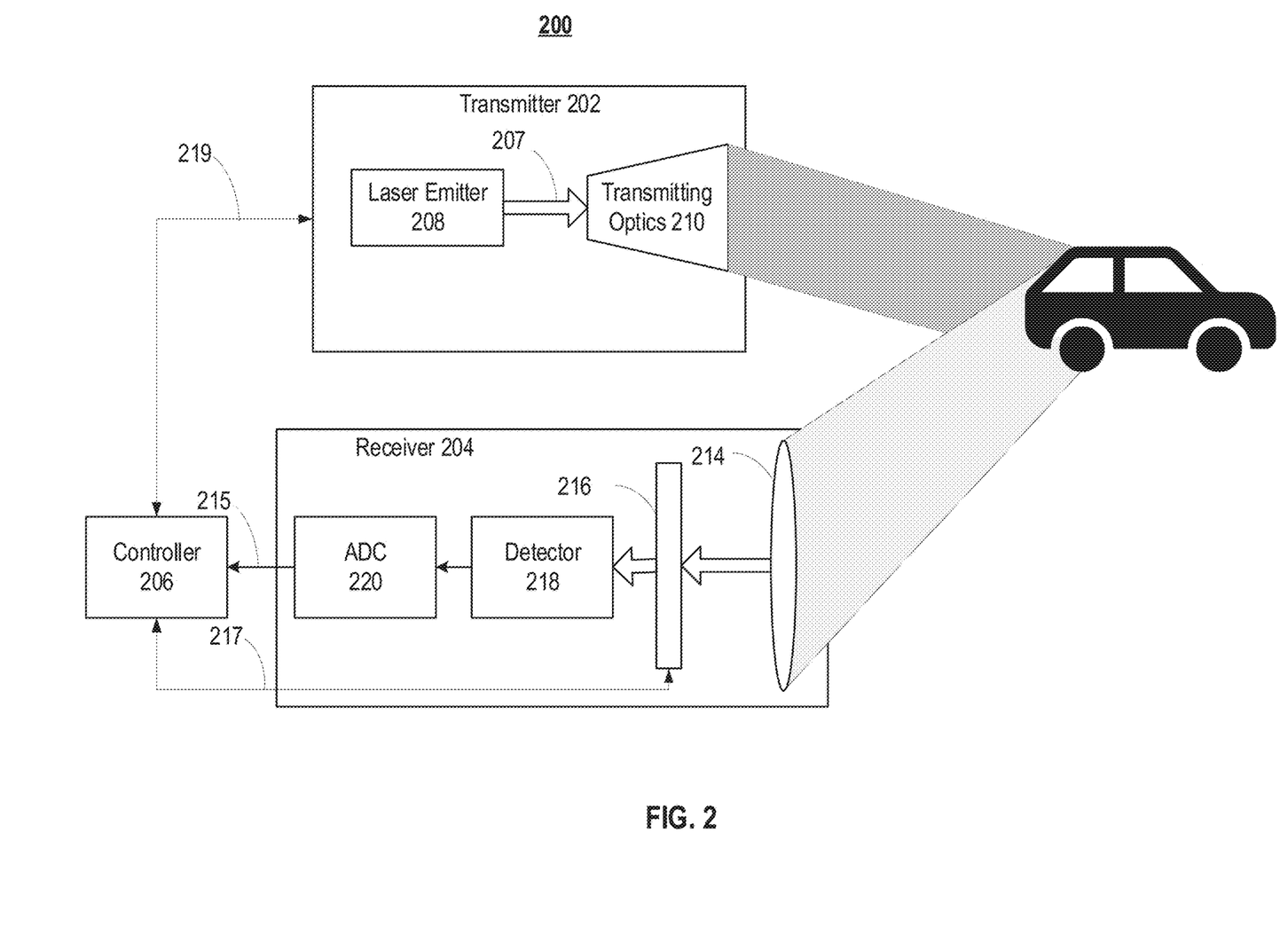
FIG. 2 illustrates a block diagram of an exemplary flash LiDAR system, according to embodiments of the disclosure.
Figure 4A:
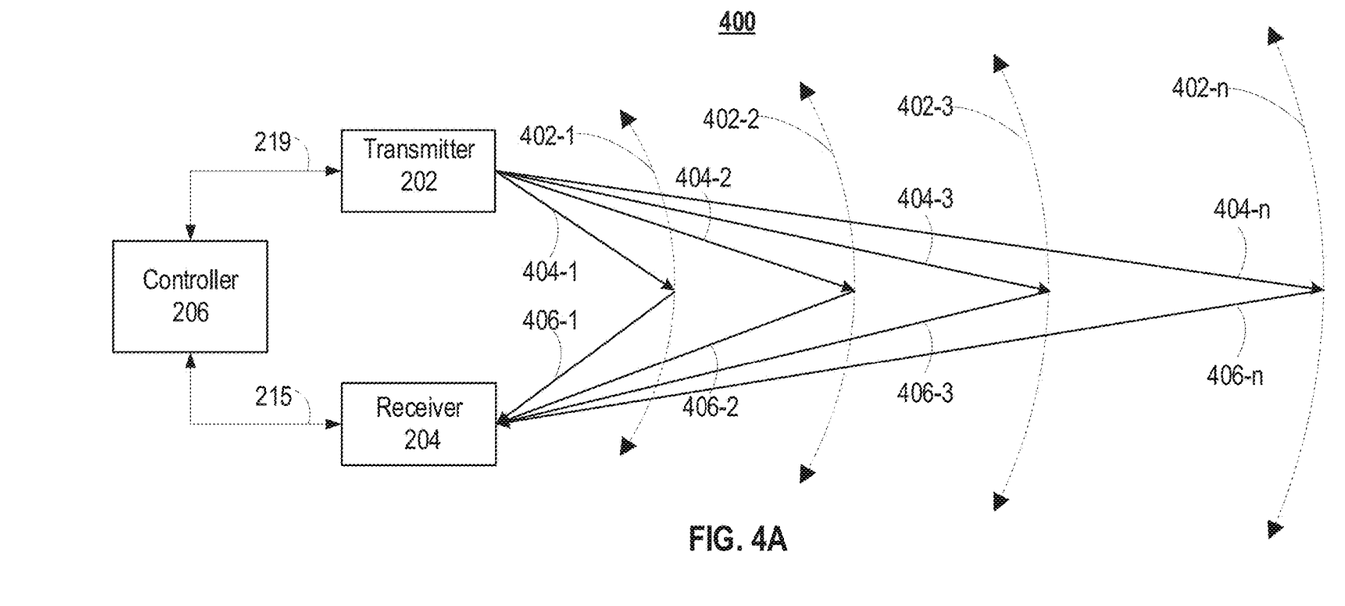
FIG. 4A illustrates an exemplary application scenario for sequentially sensing each of a plurality of sections within a detection range of a flash LiDAR system, according to embodiments of the disclosure.
Figure 4B:
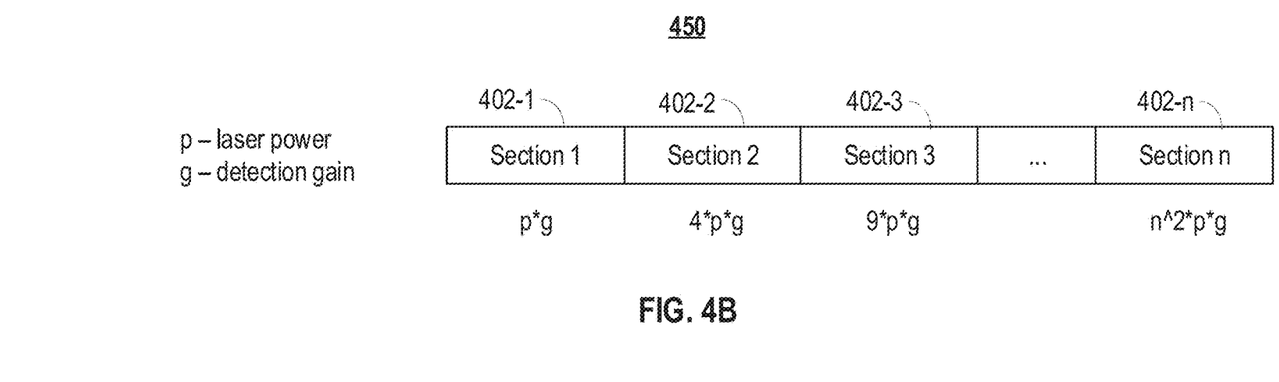
FIG. 4B illustrates an exemplary dynamic signal control of emitting power and detecting gain for each of a plurality of sections within a detection range of a flash LiDAR system, according to embodiments of the disclosure.

FIG. 2 illustrates a block diagram of an exemplary flash LiDAR system 102, according to embodiments of the disclosure. LiDAR system 102 may include a transmitter 202, a receiver 204, and a controller 206. Transmitter 202 may emit wide diverging laser beams for sensing the whole detection range with a single pulse. Transmitter 202 may include one or more laser sources (e.g., a laser emitter 208) and transmitting optics 210. Transmitter 202 can sequentially emit a stream of wide diverging laser beams for different sections of the detection range, more detail of which will be illustrated in FIG. 4.

Laser emitter 208 may be configured to provide laser beams 207 (also referred to as "native laser beams") to transmitting optics 210. In some embodiments of the present disclosure, laser emitter 208 may generate pulsed laser beams in the ultraviolet, visible, or near-infrared wavelength range. Consistent with the present disclosure, each laser beam 207 may include a sequence of pulses that are specifically timed at a predetermined time interval apart (also referred to as "time delay"). The time delay may be measured between the peaks of two consecutive pulses in the sequence. In some embodiments of the present disclosure, laser emitter 208 may include a pulsed laser diode (PLD), a vertical-cavity surface-emitting laser (VCSEL), a fiber laser, etc. For example, a PLD may be a semiconductor device similar to a light-emitting diode (LED) in which the laser beam is created at the diode's junction. In some embodiments of the present disclosure, a PLD includes a PIN diode in which the active region is in the intrinsic (I) region, and the carriers (electrons and holes) are pumped into the active region from the N and P regions, respectively. Depending on the semiconductor materials, the wavelength of incident laser beams 207 provided by a PLD may be smaller than 1,100 nm, such as 405 nm, between 445 nm and 465 nm, between 510 nm and 525 nm, 532 nm, 635 nm, between 650 nm and 660 nm, 670 nm, 760 nm, 785 nm, 808 nm, 848 nm, or 905 nm. It is understood that any suitable laser emitter may be used as laser emitter 208 for emitting laser beams 207.

Transmitting optics 210 may be configured to spread a single laser to illustrate the whole detection range at once. In some embodiments, transmitting optics 210 may include one or more optical components (e.g., optical diffusers) that can shape the outgoing laser pulse to a detection range. In some embodiments, optical diffusers with different angles may be used for shaping the outgoing laser pulse. For instance, a wide-angle diffuser may provide a beam divergence of 20°, while a narrow-angle diffuser may provide a beam divergence of 12°. It is understood that the optical diffusers with other different angles of beam divergence are also contemplated in the present disclosure. Under certain application scenarios, there may be more than one optical diffuser included in the transmitting optics 210, to generate a desired detection range in environmental sensing.

Receiver 204 may be configured to detect optical signals returned from the detection range. Returned optical signals may be from different sections that have different signal strengths. As the laser beam reaches different sections in the detection range at different time, they are reflected by an object(s) from different sections sequentially. Accordingly, returning optical signals may include multiple return pulses separated by the predetermined time delay. Receiver 204 can collect laser beams returned from the respective sections and output electrical signals reflecting the intensity of the returned optical signals. Upon contact, laser light can be reflected/scattered by objects in different sections via back-scattering, such as Rayleigh scattering, Mie scattering, Raman scattering, and fluorescence.

As illustrated in FIG. 2, receiver 204 may include a lens 214, an electric shutter 216, a detector 218, and an ADC 220. Lens 214 may be configured to collect optical signals returned from the detection range and focus the returned optical signals on detector 218. At each time point, optical signals returned from different objects at different distances to LiDAR system 102 may be collected by lens 214. The returned optical signals may have the same waveform (e.g., bandwidth and wavelength) as optical signals emitted from transmitter 202.

Electric shutter 216 may be configured to control the pass of the returned optical signals from lens 214 to detector 218. Electric shutter 216 may be controlled to close, to prevent the optical signals from being detected by detector 218. Alternatively, electric shutter 216 may be controlled to open, to allow the optical signals collected at lens 214 to be detected by detector 218. In some embodiments, electric shutter 216 may be configured to communicate with controller 206 via signal line 217. Controller 206 may provide instructions when electric shutter 216 should open or close. For instance, controller 216 may provide a detection time window to electric shutter 216 for each section of the plurality of sections in the detection range of LiDAR system 102. Following the instruction from controller 216, electric shutter 216 may be configured to open at the beginning of the provided detection time window and close at the end of the detection time window. In some embodiments, instead of receiving instructions from controller 206, electric shutter 216 may have a predefined schedule to open or close at different time points. For instance, if LiDAR system 102 has a fixed or predefined number of sections and predefined range of distances for each section, electric shutter 216 may be configured to open and close according to a predefined schedule without being directed by controller 206. This may save bandwidth used for communication in LiDAR system 102.

Detector 218 may be configured to detect optical signals returned from the respective sections and collected by lens 214. In some embodiments, detector 218 may convert an optical signal (e.g., returned laser pulse) collected by lens 214 into an electrical signal (e.g., a current or a voltage signal). Electrical signal may be an analog signal which is generated when photons are absorbed in a photodiode included in detector 218. In some embodiments, detector 218 may include a PIN detector, an avalanche photodiode (APD) detector, a single photon avalanche diode (SPAD) detector, a silicon photo multiplier (SiPM) detector, a ToF camera, or the like.

ADC 220 may be configured to digitize the electrical signal generated by detector 218. For example, ADC 220 may convert the electrical signal into a digital signal 215 (e.g., data points representing the intensity of the electrical signal at each sampling time point). In some embodiments, data points in the digital signal may be sampled from two or more pulses in the returned laser beam. Digital signal may be transmitted to controller 206 to be processed and analyzed. For example, controller 206 in LiDAR system 102 may include a processor to determine the distance of objects from LiDAR system 102 based on digital signal and data of optical signals. In particular, the distance can be determined based on the travel time measured between the departure time of the first laser pulse when it is emitted by transmitter 202 and the arrival time of the first returned laser pulse when it is received by receiver 204. In some alternative embodiments, digital signal may be transmitted to and processed by a separate signal processor at a different location but communicating with controller 206 through a network (not shown). For example, the separate signal processor may be in a cloud or may be alternatively in a single location (such as inside a mobile device) or distributed locations.

Controller 206 may be configured to control transmitter 202 and/or receiver 204 to perform detection/sensing operations. In some embodiments, controller 206 may control laser emitter 208 to emit optical signals including a sequence of laser pulses. The time delay between the laser pulses may be determined by controller 206 or preprogrammed in controller 206. In some embodiments, controller 206 may further control transmitting optics 210 to emit laser beams and record the departure time of an emitted laser pulse in laser beams. The departure time of the emitted laser pulse and the time delay between the laser pulses may be stored in controller 206 for determining a traveling time of the emitted laser pulse.

In some embodiments consistent with the present disclosures, controller 206 may be configured to divide the detection range of LiDAR system 102 into a plurality of sections. In some embodiments, controller 206 may be configured to also determine emitting power and/or detecting gain for each section of the detection range, and control transmitter 202 to emit an optical signal at the determined emitting power and receiver 204 to receive the returned optical signal at the determined detecting gain. In some embodiments, controller 206 may be further configured to determine a detection time window for each section in the detection range, and/or control electric shutter 216 to open and close at the determined detection time window for each section. In some embodiments, controller 206 may be configured to further receive digital signals 215 returned from different sections, and combine these signals into a combined signal (may be referred to as the detection signal of the detection range), and generate a 3-D representation of the detection range according to the combined signal.

Figure 3:
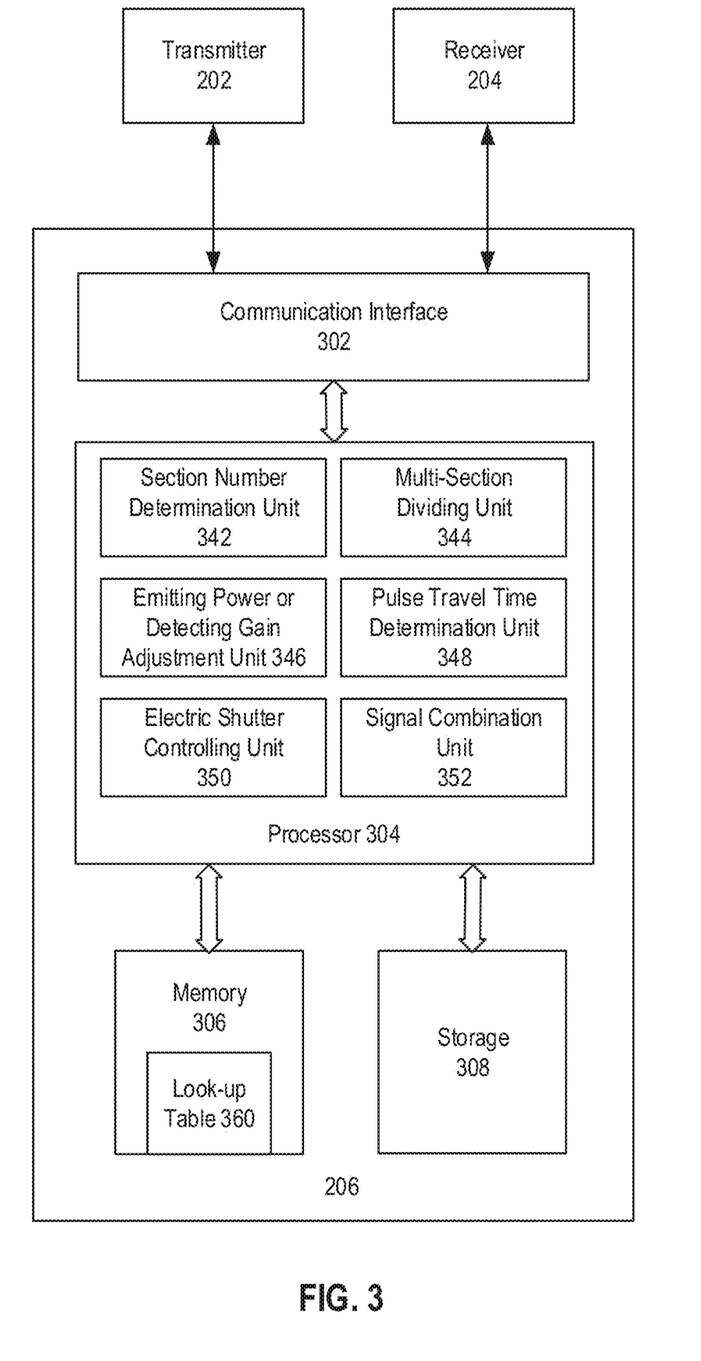
FIG. 3 illustrates a schematic diagram of an exemplary controller for dynamic signal control for a flash LiDAR system, according to embodiments of the disclosure.

FIG. 3 illustrates a schematic diagram of an exemplary controller 206 for dynamic signal control of a LiDAR system, according to embodiments of the disclosure. As illustrated in FIG. 3, controller 206 may include a communication interface 302, a processor 304, a memory 306, and a storage 308. In some embodiments, controller 206 may have different modules in a single device, such as an integrated circuit (IC) chip (e.g., implemented as an application-specific integrated circuit (ASIC) or a field-programmable gate array (FPGA)), or separate devices with dedicated functions. In some embodiments, one or more components of controller 206 may be located in a cloud or may be alternatively in a single location (such as inside a mobile device) or distributed locations. Components of controller 206 may be in an integrated device or distributed at different locations but communicate with each other through a network (not shown).

Consistent with the present disclosure, controller 206 may be configured to divide a detection range of an optical sensing system (e.g., flash LiDAR system 102) into a plurality of sections, determine a proper emitting power and/or detecting gain for each section of the plurality of sections, control transmitter 202 to emit an optical signal according to the determined emitting power for each section, control receiver 204 to detect the returned optical signal according to the determined detecting gain for each section, and combine the returned signals from each section of the plurality of sections, to generate a combined signal for the detection range of the optical sensing system.

Communication interface 302 may be configured to send signals to and receive signals from components of transmitter 202 (such as transmitting optics 210) and receiver 204 (such as electric shutter 216) via wired communication methods, such as Serializer/Deserializer (SerDes), Low-voltage differential signaling (LVDS), Serial Peripheral Interface (SPI), etc. In some embodiments, communication interface 402 may optionally use wireless communication methods, such as a Wireless Local Area Network (WLAN), a Wide Area Network (WAN), wireless networks such as radio waves, a cellular network, and/or a local or short-range wireless network (e.g., Bluetooth™), or other communication methods. In such an implementation, communication interface 302 can send and receive electrical, electromagnetic or optical signals in analog form or digital form.

Consistent with some embodiments, communication interface 302 may transmit signal control information including the transmitting power and/or detecting gain for each section to transmitter 202 and/or receiver 204, respectively. In addition, communication interface 302 may also provide control signals to electric shutter 216 in receiver 204, to control electric shutter 216 to open and close according to a determined detection time window for each section. Communication interface 302 may also receive acquired signals from and provide control signals to various other components of LiDAR system 102. In one example, communication interface 302 may receive from receiver 206 the digital signals returned/generated for each section.

Processor 304 may include any appropriate type of general-purpose or special-purpose microprocessor, digital signal processor, or microcontroller. Processor 304 may be configured as a separate processor module dedicated to LiDAR multi-section environment sensing, e.g., sensing the environment information by dividing the detection range of the optical sensing system into a plurality of sections, each of which is independently sensed using an emitting power and/or detecting gain properly determined for each section, and combining signals detected for each section to generate a combined signal for the whole detection range of the optical sensing system.

Memory 306 and storage 308 may include any appropriate type of mass storage provided to store any type of information that processor 304 may need to operate. Memory 306 and storage 308 may be a volatile or non-volatile, magnetic, semiconductor, tape, optical, removable, non-removable, or other types of storage device or tangible (i.e., non-transitory) computer-readable medium including, but not limited to, a ROM, a flash memory, a dynamic RAM, and a static RAM. Memory 306 and/or storage 308 may be configured to store one or more computer programs that may be executed by processor 304 to perform various functions disclosed herein. For example, memory 306 and/or storage 308 may be configured to store program(s) that may be executed by processor 304 for multi-section LiDAR sensing. In some embodiments, memory 306 and/or storage 308 may also store information and data used or generated by processor 304, such as digital signals converted by ADC 220 from the returned laser pulses for each section, determined emitting power and/or detecting gain for each section, determined detection time window for each section, section information of divided sections in the detection range including the number of divided sections and range of distances of each divided section, and combined signal of the detection range, etc.

As shown in FIG. 3, processor 304 may include multiple modules, such as a section number determination unit 342, a multi-section dividing unit 344, an emitting power or detecting gain adjustment unit 346, a pulse travel time determination unit 348, an electric shutter controlling unit 350, and a signal combination unit 352, and the like. These modules can be hardware units (e.g., portions of an integrated circuit) of processor 304 designed for use with other components or software units implemented by processor 304 through executing at least part of a program. The program may be stored on a computer-readable medium, and when executed by processor 304, it may perform one or more functions. Although FIG. 3 shows units 342-352 all within one processor 304, it is contemplated that these units may be distributed among different processors located closely or remotely with each other.

Section number determination unit 342 may be configured to determine the number of sections that the detection range of a LiDAR system is to be divided into. The value for the number of to-be-divided sections is based on many factors, including the size of the detection range, the processing capacity of the system architecture, the time allowed for detecting each field of view (or conversely the detection speed), the objective of the sensing, the complexity of the environment, among others. It is desirable to divide the detection range into as many sections as possible, so that the distance-caused detection variations within each section may be minimized. However, the processing capacity and detection speed requirement of a LiDAR system may limit the number of sections that can be divided. This is especially true for a LiDAR system applied in autonomous driving, which requires consistent monitoring of the dynamic environment surrounding a vehicle. In one exemplary scenario, if a LiDAR system is capable of detecting objects with 10% reflectivity up to 100 m, after considering different factors, controller 206 may divide the 100 m detection range into 4 different sections, e.g., 0-25 m, 25-50 m, 50-75 m, and 75-100 m sections.

In some embodiments, the number of sections to be divided for a detection range of a LiDAR system may be dynamically modified. For instance, the number of sections for a LiDAR system may vary according to the complexity of the environment. In one example, if a vehicle runs into high traffic in an urban area, it may be desirable to have as many sections as possible, so that more accurate 3-D location and reflectivity information may be obtained for the detection range of the system. On the other hand, if the vehicle is running in a remote rural area with very limited traffic, fewer sections may be divided for the detection range of the system.

Multi-section dividing unit 344 may be configured to divide the detection range of a LiDAR system into the number of sections determined by section number determination unit 342. Multi-section dividing unit 344 may divide the detection range into the determined number of sections in an arc format in a distance-related mode. That is, the detection range is divided into multiple arc-shaped sections, each having a different range of distances to the LiDAR system. For instance, as illustrated in FIG. 4A, the detection range may be divided into n sections defined by arc-shaped arrows 402-1, 402-2, 403-3, . . . , and 402-n. Two arc-shaped arrows define one section, except that the section closest to LiDAR system 102 is defined by one arc-shape arrow 402-1.

It is understood that while each section covers an equal radial distance in the illustrated diagram in FIG. 4A and in the aforementioned example (i.e., 25 m for each section), the radial distance covered by each section may be different. For instance, for a moving vehicle, for the regions that are closer to the vehicle (i.e., dangerous zones), the sections may be smaller, to ensure high accuracy of 3-D location and reflectivity information to be obtained. However, for the regions that are far from the vehicle and considered to be safer zones, the sections might be larger. In this way, the processing power of the LiDAR system may be focused more on processing information related to dangerous zones closer to the moving vehicle.

Emitting power or detecting gain adjustment unit 346 may be configured to adjust the emitting power and/or detecting gain for each section of the plurality of sections within the detection range of a LiDAR system. In general, when emitting a laser pulse into the environment, the returning signal from the environment will decrease with distance, e.g., inversely proportional to the square of the distance. That is, for an object in section n that has a n*distance from the LiDAR system when comparing to the same object in section 1, the returning signal will be only $1/n^2$ of the object in section 1. To ensure the electrical current/voltage out of the photodetector to be consistent between the objects in the two sections (section A and section B farther away than section A), it might be desirable to adjust the detecting gain by either increasing the detecting gain for section B or decreasing the detecting gain for section A. Alternatively, the emitting power of the excitation light from the laser source may be adjusted. That is, emitting power is increased for section B or decreased for section A. In some embodiments, both emitting power and detecting gain can be adjusted. The objective of the adjustment(s) is to allow the product of emitting power and detecting gain for each section to be proportional to a square of a distance (e.g., a maximum distance in the range of distances), covered by each section, to the LiDAR system.

For example, FIG. 4B illustrates an exemplary dynamic signal control of emitting power and detecting gain for each of a plurality of sections within a detection range of a flash LiDAR system, according to embodiments of the disclosure. As illustrated, if the product of emitting power (p) and detecting gain (g) for section 402-1 is optimal for sensing the objects in that section, for section 402-2, the product of emitting power and detecting gain is then controlled or adjusted to be $2^2*p*g$ for optimal sensing of the objects in that section. Similarly, for section 402-3, the product of emitting power and detecting gain may be adjusted or controlled to be $3^2*p*g$, and so on for any n-th section.

Returning back to FIG. 3, to allow proper detection of returning signal from each section, controller 206 may further include a pulse travel time determination unit 348 that is configured to determine the time window for detecting signal returning from one specific section, and an electric shutter controlling unit 350 that is configured to control electric shutter 216 to open only in the determined time window for that specific section. In this way, the returning signals from other sections may be blocked by electric shutter 216, which then allows detection of the returning signal from that specific section to be not affected by signals from other sections that have different signal strengths (due to the block effect of electric shutter 216 for other sections).

To determine a detection time window for each section, pulse travel time determination unit 348 may determine signal travel time for point(s) closest to a LiDAR system and point(s) furthest away from the LiDAR system in that section. For instance, in the application scenario illustrated in FIG. 4A, for the section defined by arrows 402-1 and 402-2 (i.e., section 2), the signal travel time $t_1$ for the closest point(s) may be determined based on the total distance indicated by arrows 404-1 and 406-1, while the signal travel time $t_2$ for the furthest point(s) may be determined based on the total distance indicated by arrows 404-2 and 406-2. The detection time window for detecting signals returned from section 2 then falls between $t_1$ and $t_2$. To achieve this, electric shutter controlling unit 350 then controls electric shutter 216 to delay until time point $t_1$ to open and then close at time point $t_2$, so that only the signal returned from section 2 is received by receiver 204, while the signals returned from other sections are blocked by electric shutter 216. By sequentially controlling electric shutter 216 to open in the corresponding detection time window for each section, the signal returned from each section may be received by receiver 204, which are then subject to further processing by other components in receiver 204 and/or controller 206.

Signal combination unit 352 in controller 206 may be configured to combine signals (e.g., digital signals from ADC 220) received from each section to generate a combined signal for the entire detection range. In this way, the signal for the whole detection range of the LiDAR system may be obtained. Signal combination unit 352 may combine returning signals in the time domain. Based on the detection time window including the signal travel time for points in the borders of each section, signal combination unit 352 may easily organize signals returned from each section during signal combination. For instance, since the detection time window for section 2 is further delayed when compared to section 1, the signal from section 2 is organized in a way further away from the LiDAR system when generating a 3-D representation of the detection range of the system.

Figure 5:
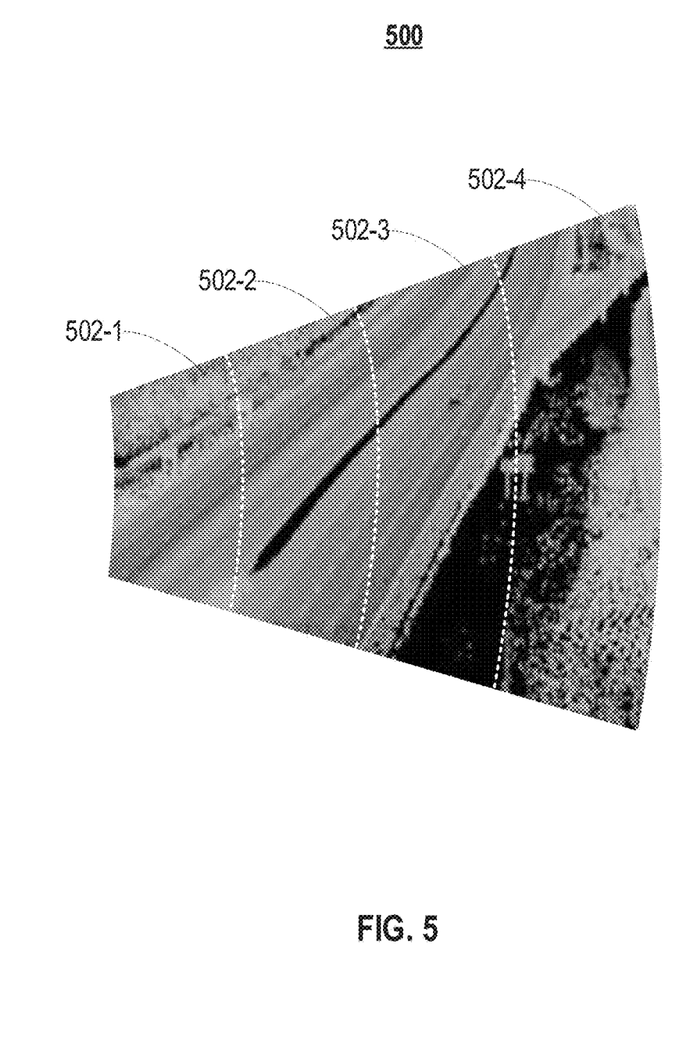
FIG. 5 illustrates a combining of exemplary signals returned from a plurality of sections within a detection range of a flash LiDAR system, according to embodiments of the disclosure.

FIG. 5 illustrates an exemplary combination of signals from a plurality of sections, according to embodiments of the disclosure. As illustrated, the signal from four sections 502-1, 502-2, 502-3, and 502-4 may be combined on the time domain (i.e., according to delayed detection time windows to organize the sections 502-1, 502-2, 502-3, and 502-4 according to a distance from the LiDAR system).

Figure 6:
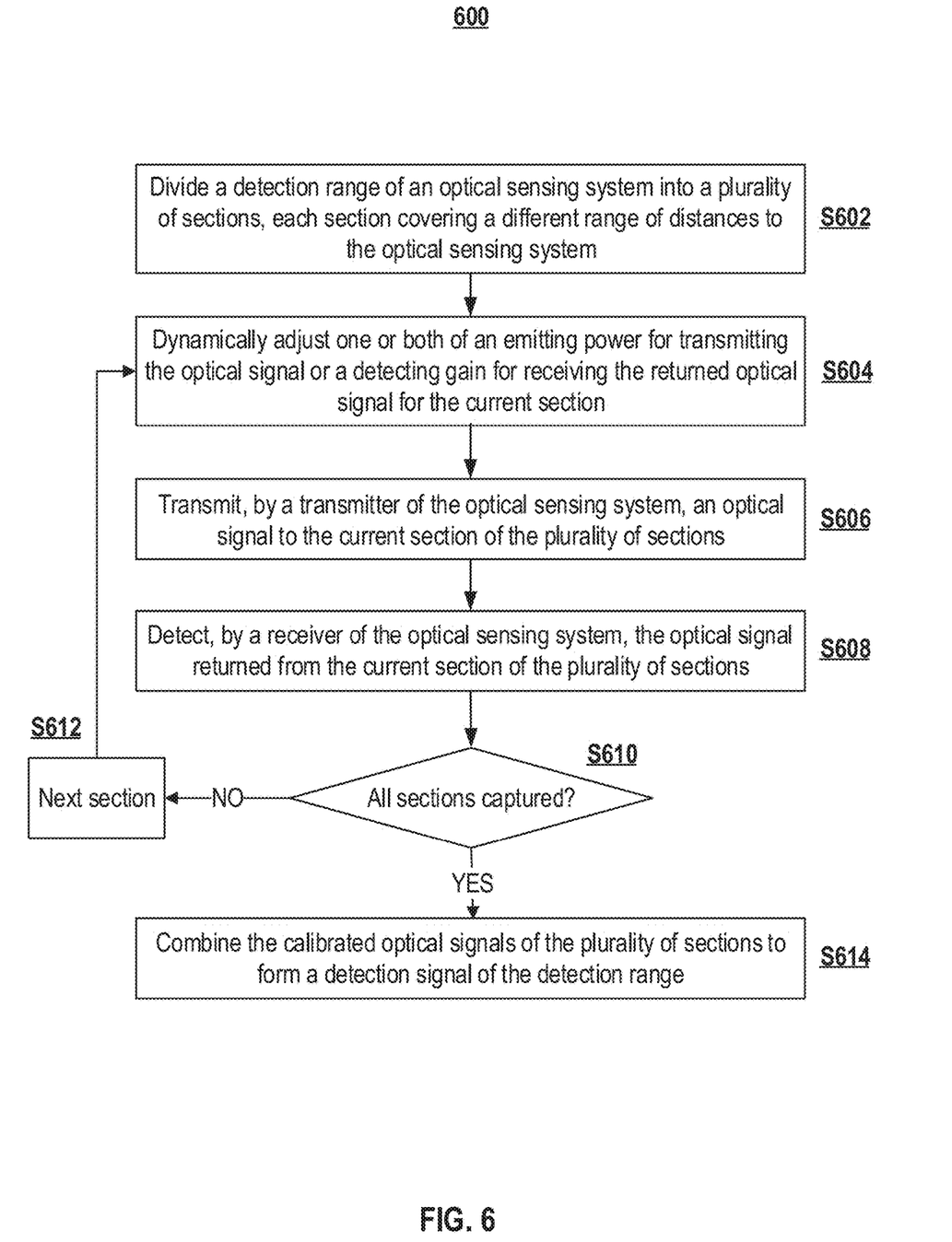
FIG. 6 is a flow chart of an exemplary method for dynamic signal control of an optical sensing system for detecting a plurality of sections within a detection range of a flash LiDAR system, according to embodiments of the disclosure.

FIG. 6 is a flow chart of an exemplary method 600 for sensing a plurality of sections within a detection range, according to embodiments of the disclosure. In some embodiments, method 600 may be performed by various components of LiDAR system 102, e.g., transmitter 202, receiver 204, and controller 206. In some embodiments, method 600 may include steps S602-S614. It is to be appreciated that some of the steps may be optional. Further, some of the steps may be performed simultaneously, or in a different order than that shown in FIG. 6.

In step S602, controller 206 may divide a detection range of an optical sensing system into a plurality of sections, where each section covers a different range of distances to the optical sensing system. Controller 206 may consider many factors in dividing the detection range into the plurality of sections. For instance, controller 206 may consider the size of the detection range (i.e., the maximal distance covered by the optical sensing system), the processing capacity of the system architecture, the time allowed for sensing each field of view, the objective of the sensing, the complexity of the environment, among others, in dividing the detection range into multiple sections. The sections are divided in an arc format in a distance-based mode. Each section may thus cover a different range of distances from the optical sensing system. In some embodiments, controller 206 may divide the detection range of the optical sensing system into a fixed number of sections. In other embodiments, the number of divided sections may be dynamically adjusted based on different factors, such as the complexity of the environment, the objective of the sensing, and so on.

In step S604, for each divided section, controller 206 may dynamically adjust one or both of an emitting power for transmitting the optical signal and a detecting gain for receiving the returned optical signal for that section. In some embodiments, only the transmitting power is adjusted for the section, since the adjustment of transmitting power is an easier process when compared to the adjustment of the detecting gain. In some embodiments, only detecting gain is adjusted for the section, since the transmitting power may be already adjusted to the maximum. In some embodiments, both the transmitting power and detecting gain may be adjusted, so that a much wider adjustment range can be achieved. In addition, by adjusting both the transmitting power and detecting gain, it may be expected that the transmitting power and detecting gain can be kept at a proper level for each section, when comparing to adjusting only one of the two. For instance, good images are collected with a low detecting gain. If continuing to increase the detecting gain to a maximum, the image quality may be worsened through the process.

In some embodiments, when adjusting the emitting power and/or detecting gain for different sections, since the returning signal normally decreases with distance (e.g., inversely proportional to the square of the distance), it may be proper to keep the product of the emitting power and detecting gain for each section to be proportional to a square of a maximum distance in the range of distances covered by each section. Implemented this way may allow the detected signals from different sections to be similar to each other or fall in a similar range. Therefore, when signals from different sections are combined, a more uniform 3-D representation of the detection range and/or a better quality of an image can be achieved.

In step S606, transmitter 202 of the optical sensing system then transmits an optical signal to the current section (it is understood that the optical signal can clearly be transmitted to other sections as well, but only the current section is emphasized here, for the purpose of description). Transmitter 202 may set the transmitting power to a level determined for the current section based on the transmitting power and/or detecting gain determined by controller 206 for the section.

In step S608, receiver 204 of the optical sensing system detects the optical signal returned from the current section of the plurality of sections. Similar to transmitter 202, receiver 204 may also set the detecting gain used for detecting the returned signal to a level determined for the current section based on the transmitting power and/or detecting gain determined by controller 206 for the section.

To ensure receiver 204 to receive the returning signal only from the current section but not from the other remaining sections in the detection range, controller 206 may determine the detection time window for the current section based on the ToF of signals for the points closest to the optical sensing system and furthest away from the optical sensing system in the current section. Controller 206 may then control electric shutter 216 to open only during the detection time window for the current section. In this way, although other sections also return signals to receiver 204, these signals are blocked by electric shutter 216, so as not to be detected by detector 218, and thus will not affect the signal detection of the current section.

After detecting the returned signal from the current section, in step S610, controller 206 may determine whether all divided sections in the detection range are captured. If not (S610: NO), at step 612, controller 206 may begin to sense the information for the next section by repeating steps S604-S608.

It is understood that different orders may be used for selecting the next section for sensing. For instance, depending on the configuration, controller 206 may sense each of the plurality of sections according to a distance from the closest to the furthest, according to a distance from the furthest to the closest, according to a random order, or according to any other order that deems to be proper for the optical sensing system to detect each section.

It is also understood that in some embodiments, not every section in the detection range is to be detected, thereby saving power in processing. For instance, if vehicle 100 is traveling to a rural area that has less traffic and thus requires to sense a range smaller than the detection capacity of the optical sensing system, controller 206 may control the optical sensing system to skip one or more sections furthest away from the optical sensing system during the sensing process, to saving energy and resources of the vehicle. To achieve this, there will no optical signals to be emitted for these sections. Other application scenarios that cause certain sections to be skipped from the sensing are also contemplated.

After all sections (except some sections that are intentionally skipped) are sensed/detected (S610: YES), at step S614, controller 206 then combines the detected optical signals of the plurality of sections, to form a detection signal of the detection range. Controller 206 may organize returning signals from different sections on the time domain. For instance, controller 206 may recognize the detection time window for each section, and organize sections with a longer time delay to be further away from the optical sensing system. After signals from each section are combined, a combined signal may be generated for the whole detection range of the optical sensing system, so that a proper 3-D representation and reflectivity information of the detection range may be obtained.

It is to be understood that, since detected signals from each section have similar strength or in a similar strength range due to the dynamic control of emitting power and/or detecting gain for each section in the present disclosure, the combined signal is more uniform, no matter how far each section is away from the optical sensing system. Implemented this way, a more uniform 3-D representation of a wider detection range may be achieved for the disclosed optical sensing system when compared to other currently available optical sensing systems.

Although the disclosure is made using a LiDAR system as an example, the disclosed embodiments may be adapted and implemented to other types of optical sensing systems that use receivers to receive optical signals not limited to laser beams. For example, the embodiments may be readily adapted for optical imaging systems or radar detection systems that use electromagnetic waves to scan objects. Emitters other than those disclosed above may be used. For example, the emitter may be any other light emitter suitable for emitting the optical signals used by the respective optical sensing systems and the driver circuit may be any driver suitable to drive the respective emitter.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A method for controlling an optical sensing system, the method comprising:
dividing a detection range of the optical sensing system into a plurality of sections, each section covering a different range of distances to the optical sensing system;
simultaneously adjusting both of an emitting power and a detecting gain such that a product of the emitting power and the detecting gain for each section is proportional to a square of a representative distance in the range of distances covered by that section;
transmitting, by a transmitter of the optical sensing system, an optical signal to each section of the plurality of sections based on the emitting power adjusted for the corresponding section;
detecting, by a receiver of the optical sensing system, the optical signal returned from the corresponding section of the plurality of sections based on the detecting gain adjusted for the corresponding section; and
combining the optical signals returned from the plurality of sections to form a detection signal of the detection range.

2. The method of claim 1, wherein transmitting the optical signal to each section of the plurality of sections comprises:
transmitting a first optical signal to a first section of the plurality of sections; and
transmitting a second optical signal to a second section of the plurality of sections, wherein the second section is further away from the optical sensing system than the first section, and the second optical signal has a larger emitting power than the first optical signal.

3. The method of claim 1, wherein detecting the optical signal returned from each section of the plurality of sections comprises:
detecting a first optical signal returned from a first section of the plurality of sections; and
detecting a second optical signal returned from a second section of the plurality of sections, wherein the second section is further away from the optical sensing system than the first section, and the second optical signal is detected using a higher detecting gain than the first optical signal.

4. The method of claim 1, wherein the representative distance is a maximum distance in the range of distances covered by that section.

5. The method of claim 1, wherein detecting the optical signal returned from each section of the plurality of sections comprises:
- determining a detection time window for detecting the optical signal returned from each section of the plurality of sections; and
- controlling the receiver to detect the returned optical signal from each section according to the determined detection time window for each section.

6. The method of claim 5, wherein determining the detection time window for detecting the optical signal returned from each section of the plurality of sections comprises:
- determining a first time point based on a first time-of-flight for a signal traveling from the transmitter to the receiver via a first point of that section, the first point being a point closest to the transmitter in that section;
- determining a second time point based on a second time-of-flight for the signal traveling from the transmitter to the receiver via a second point of that section, the second point being a point furthest away from the transmitter in that section; and
- determining the detection time window for each section based on the first time point and the second time point for that section.

7. The method of claim 5, wherein controlling the receiver to detect the returned optical signal from each section according to the determined detection time window for each section comprises:
- controlling an electric shutter based on the determined time window, to allow only the returned signal from that section to be captured by a detector included in the receiver.

8. The method of claim 1, wherein, prior to dividing the detection range into the plurality of sections, the method further comprises:
- determining a number of sections for the plurality of sections according to one or more of an application scenario and system architecture of the optical sensing system.

9. An optical sensing system, comprising:
- a transmitter configured to transmit an optical signal to each section of a plurality of sections, the plurality of sections being divided from a detection range of the optical sensing system, and each section covering a different range of distances to the optical sensing system;
- a receiver configured to detect the optical signal returned from each section of the plurality of sections; and
- a controller configured to:
  - divide the detection range of the optical sensing system into the plurality of sections;
  - simultaneously adjust both of an emitting power and a detecting gain such that a product of the emitting power and the detecting gain for each section is proportional to a square of a representative distance in the range of distances covered by that section; and
  - combine the optical signals returned from the plurality of sections to form a detection signal of the detection range.

10. The optical sensing system of claim 9, wherein, to transmit the optical signal to each section of the plurality of sections, the transmitter is configured to:
- transmit a first optical signal to a first section of the plurality of sections; and
- transmit a second optical signal to a second section of the plurality of sections, wherein the second section is further away from the optical sensing system than the first section, and the second optical signal has a larger emitting power than the first optical signal.

11. The optical sensing system of claim 9, wherein, to detect the optical signal returned from each section of the plurality of sections, the detector is configured to:
- detect a first optical signal returned from a first section of the plurality of sections; and
- detect a second optical signal returned from a second section of the plurality of sections, wherein the second section is further away from the optical sensing system than the first section, and the second optical signal is detected using a higher detecting gain than the first optical signal.

12. The optical sensing system of claim 9, wherein the representative distance is a maximum distance in the range of distances covered by that section.

13. The optical sensing system of claim 9, wherein, to detect the optical signal returned from each section of the plurality of sections, the controller is configured to:
- determine a detection time window for detecting the optical signal returned from each section of the plurality of sections; and
- control the receiver to detect the returned optical signal from each section according to the determined detection time window for each section.

14. A controller for an optical sensing system, comprising:
- a processor; and
- a non-volatile memory, containing computer program instructions that are configured to be executed by the processor to perform operations comprising:
  - dividing a detection range of the optical sensing system into a plurality of sections, each section covering a different range of distances to the optical sensing system;
  - simultaneously adjusting both of an emitting power and a detecting gain such that a product of the emitting power and the detecting gain for each section is proportional to a square of a representative distance in the range of distances covered by that section;
  - controlling a transmitter of the optical sensing system to emit an optical signal to each section of the plurality of sections based on the emitting power adjusted for the corresponding section;
  - controlling a receiver of the optical sensing system to detect the optical signal returned from each section of the plurality of sections based on the detecting gain adjusted for the corresponding section; and
  - combining the optical signals returned from the plurality of sections to form a detection signal of the detection range.

15. The controller of claim 14, wherein transmitting the optical signal to each section of the plurality of sections comprises:
- transmitting a first optical signal to a first section of the plurality of sections; and
- transmitting a second optical signal to a second section of the plurality of sections, wherein the second section is further away from the optical sensing system than the first section, and the second optical signal has a larger emitting power than the first optical signal.

16. The controller of claim 14, wherein detecting the optical signal returned from each section of the plurality of sections comprises:
- detecting a first optical signal returned from a first section of the plurality of sections; and detecting a second optical signal returned from a second section of the plurality of sections, wherein the second section is further away from the optical sensing system than the first section, and the second optical signal is detected using a higher detecting gain than the first optical signal.

17. The controller of claim 14, wherein the representative distance is a maximum distance in the range of distances covered by that section.

18. The controller of claim 14, wherein detecting the optical signal returned from each section of the plurality of sections comprises:
determining a detection time window for detecting the optical signal returned from each section of the plurality of sections; and
controlling the receiver to detect the returned optical signal from each section according to the determined detection time window for each section.

19. The controller of claim 18, wherein determining the detection time window for detecting the optical signal returned from each section of the plurality of sections comprises:
determining a first time point based on a first time-of-flight for a signal traveling from the transmitter to the receiver via a first point of that section, the first point being a point closest to the transmitter in that section;
determining a second time point based on a second time-of-flight for the signal traveling from the transmitter to the receiver via a second point of that section, the second point being a point furthest away from the transmitter in that section; and
determining the detection time window for each section based on the first time point and the second time point for that section.

20. The controller of claim 18, wherein controlling the receiver to detect the returned optical signal from each section according to the determined detection time window for each section comprises:
controlling an electric shutter based on the determined time window, to allow only the returned signal from that section to be captured by a detector included in the receiver.

* * * * *